UNITED STATES PATENT OFFICE.

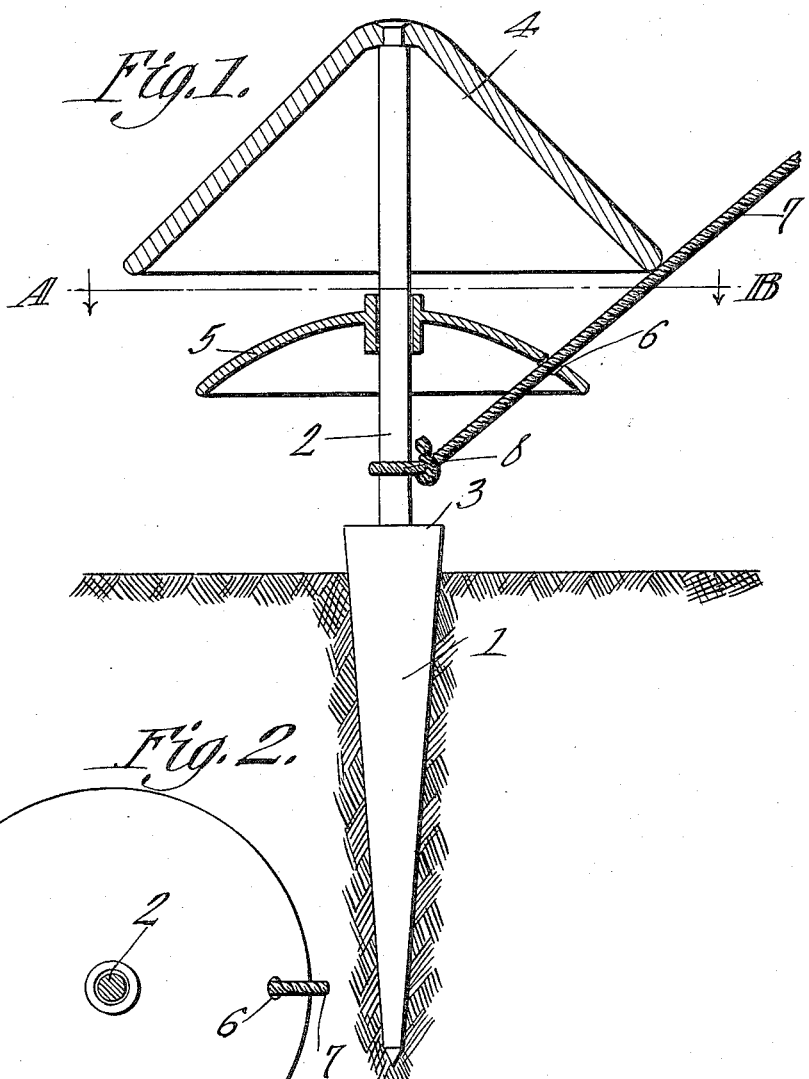

MARY F. JONES, OF WASHINGTON, DISTRICT OF COLUMBIA.

TETHER-STAKE.

1,155,421.     Specification of Letters Patent.     Patented Oct. 5, 1915.

Application filed April 20, 1915. Serial No. 22,610.

*To all whom it may concern:*

Be it known that I, MARY F. JONES, a citizen of the United States, residing at Washington, in the District of Columbia, have invented a new and useful Tether-Stake, of which the following is a specification.

This invention relates to tether stakes, one of its objects being to provide an inexpensive, durable and efficient device of this character which, when once placed in position, will prevent the tether rope from twisting therearound and limiting the activities of the secured animal.

A further object is to provide a device of this character which will not injure the animal should it fall thereon.

Another object is to provide means whereby the tether rope is prevented from freezing to the stake, but is kept free so as to rotate readily thereon under all climatic conditions.

A further object is to provide a stake which can be readily driven into the ground without injury thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a view partly in elevation and partly in section of the tether stake. Fig. 2 is a section on line A—B Fig. 1.

Referring to the figures by characters of reference 1 designates the tapered ground engaging portion of the stake, the same having a stem 2 projecting upwardly therefrom, there being a shoulder 3 at the base of the stem 2. The upper end of the stem is riveted, welded or otherwise secured in the middle portion of an inverted cup-like guard or shield 4 and slidably mounted on the stem 2 and below the shield 4 is a conical guide member 5 having an opening 6 therethrough adjacent its periphery. This opening 6 is adapted to receive the tether rope 7 and said rope is looped about and fastened to the stem 2 as indicated at 8. It will be apparent that when an animal is secured by means of the rope 7, and pulls on said rope, the guide member 5 will be held in elevated position as shown in Fig. 1. When the animal travels around the stake, the member 5 serves to hold the rope out toward the periphery of the shield 4 so that there is no danger of the rope wrapping about the stem 2. Instead the rope is caused to slide along the periphery of the guard or shield. The loop 8 is normally loose on the stem 2 but should it freeze thereto, it would be quickly loosened by the guide 5 dropping downwardly on the loop or eye 8 when the rope 7 is slack and moving upwardly therefrom when the rope is drawn taut. This shifting of the guide will thus obviously agitate the rope sufficiently to loosen it from the stem under the conditions stated.

As the guard or shield 4 is smooth and rounded, it will be obvious that should an animal fall upon the stake it will not be injured thereby. Furthermore, as the stem 2 extends up to and through the center of the guard or shield 4, it will be obvious that the said stake can be readily driven into the ground in the usual manner without injuring any of the parts. The various parts of the stake can be assembled readily and the entire structure can be made cheaply and will be found very efficient for the purpose intended.

What is claimed is:—

1. A tether stake including a stem adapted to be loosely engaged adjacent its lower end by the looped end of a tether, a rounded guard at the upper end of the stem, said guard being circular and the periphery thereof constituting a guide for the tether, and a tether guide slidably and revolubly mounted on the stem and below the guard, said guide having an opening through which the tether is adapted to extend.

2. A tether stake including a ground engaging portion, a stem extending therefrom, there being a shoulder at the base of the stem, a rounded guard at the upper end of the stem, the periphery of the guard constituting a guide edge for a tether, the lower portion of the stem being adapted to be engaged by the looped end of a tether, a tether guide slidably and revolubly mounted on the stem and having a tether receiving opening adjacent its periphery, said guide constituting a weight for pounding the looped end of the tether when the tether becomes slack.

In testimony that I claim the foregoing as my own, I have hereto affixed my signature in the presence of two witnesses.

MARY F. JONES.

Witnesses:
IVY E. SIMPSON,
PHILOMENA A. ROCKELLI.

Copies of this patent may be obtained for five cents each, by addressing the "Commissioner of Patents, Washington, D. C."